M. FLATHER.
SPEED BOX FOR SHAPING MACHINES AND THE LIKE.
APPLICATION FILED NOV. 11, 1907.
947,228.
Patented Jan. 25, 1910.
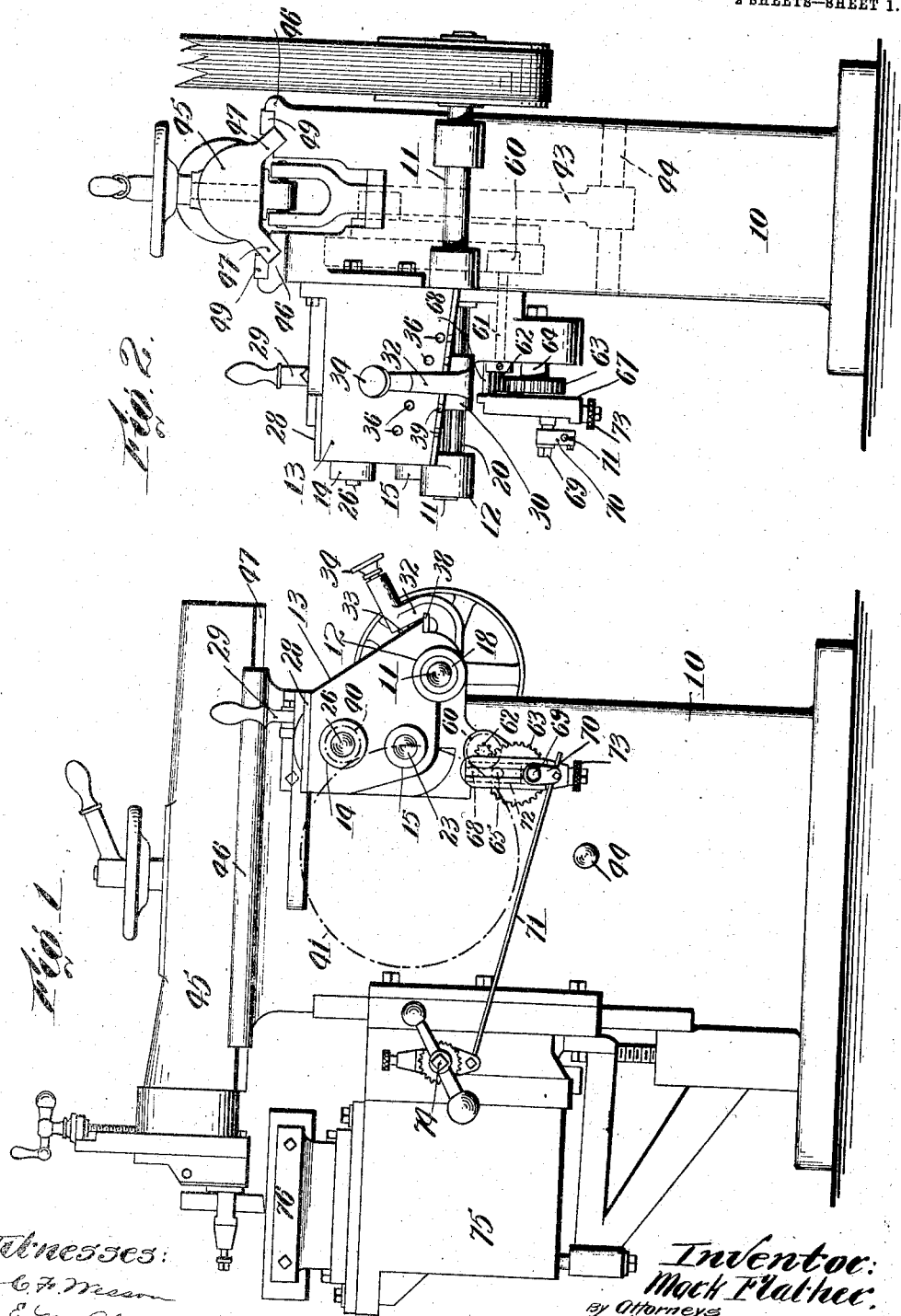

M. FLATHER.
SPEED BOX FOR SHAPING MACHINES AND THE LIKE.
APPLICATION FILED NOV. 11, 1907.
947,228.
Patented Jan. 25, 1910.
2 SHEETS—SHEET 2.
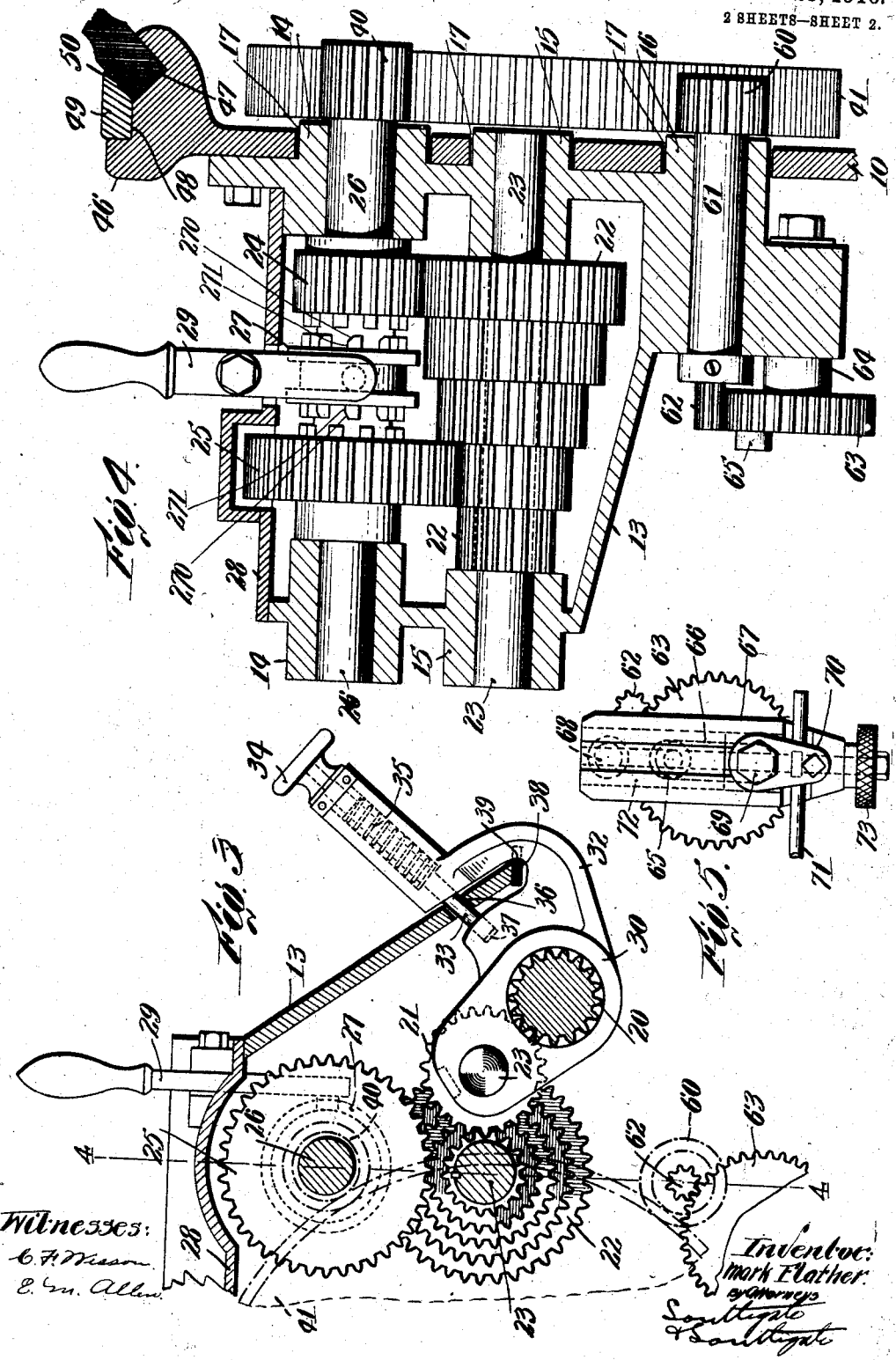

UNITED STATES PATENT OFFICE.

MARK FLATHER, OF NASHUA, NEW HAMPSHIRE.

SPEED-BOX FOR SHAPING-MACHINES AND THE LIKE.

947,228.

Specification of Letters Patent.   Patented Jan. 25, 1910.

Application filed November 11, 1907. Serial No. 401,675.

*To all whom it may concern:*

Be it known that I, MARK FLATHER, a citizen of the United States, residing at Nashua, in the county of Hillsboro and State of New Hampshire, have invented a new and useful Speed-Box for Shaping-Machines and the Like, of which the following is a specification.

This invention relates to a speed box for shaping machines and the like.

The principal objects of the same are to provide an improved speed box for supporting a speed change mechanism of such forms that it will have bearings for the shafts of the speed change mechanism as well as for the shafts of the feed device, so that it may support the speed change mechanism inside and the feed device outside, certain of said bearings being of such a character as to assist in registering the speed box with the housing of the shaping machine, whereby the speed box may be placed in position in the most convenient and simple manner, and whereby the speed changing mechanism and feed device may be set up on the speed box at the bench all complete ready for application to the housing of the machine; also to provide such construction that the shafts of the speed changing mechanism and the feed device will be provided with gears or pinions which may pass into the housing of the shaping machine and into mesh with the crank gear therein as the parts are applied to the machine in the above described manner.

Further objects of the invention are to provide an improved form of speed changing mechanism and especially an improved and efficient device for changing the speed and to improve the details thereof.

Further objects and advantages of the invention will appear hereinafter.

Reference is to be had to the accompanying drawings which show a preferred embodiment of the invention, and in which—

Figure 1 is a side elevation of a shaping machine with said preferred embodiment applied thereto. Fig. 2 is a rear elevation of the same. Fig. 3 is a transverse sectional view of the speed box. Fig. 4 is a longitudinal sectional view of the same on the line 4—4 of Fig. 3, and Fig. 5 is an end elevation of a portion of the feed device.

The machine as usual comprises a housing 10 on which is supported the driving shaft 11. This shaft is shown as in bearings on the housing and it receives power from any desired source, and extends beyond the end of the housing into bearings 12 integrally mounted on a speed box 13. This speed-box, in addition to the bearing 12 is provided with three other sets of bearings 14, 15 and 16, all of which are integral with the speed box and project beyond the surface thereof on one end of the same at least. The side of the housing is provided with a series of openings 17 which corerspond with the several projecting bearings 12, 14, 15 and 16. The speed box is secured to the housing by means of bolts or in any other desired way. In the end of one of the bearings 12 is a bushing 18 for the end of the shaft 11.

The speed changing device in its preferred form comprises a long gear 20 on the shaft 11 and located between the bearings 12 with which meshes a movable gear 21 adapted to mesh with any one of a series of gears 22. These gears are fixed to a shaft 23 mounted in the bearings 15, and two of them mesh with gears 24 and 25 loosely mounted on a shaft 26 mounted in the bearings 14. A slidable clutch 27 is mounted to turn with the shaft 26 and to slide back and forth so as to fix either one of the two gears 24 or 25 to said shaft, in which case power will be transmitted from the power shaft through the gears 20 and 21 and one of the gears 22 to the gear 24 or 25, and from that to the shaft 26. The teeth of the clutch 27 preferably are provided with slanting surfaces 270 to permit them to be thrown in at full speed, but instead of making them slant all the way back, which makes the clutching action unstable they have also flat portions 271 at the rear of the slanting portions. By this construction the advantage of quick action in throwing in the clutch is obtained without danger of breaking the teeth, while at the same time the parts may be securely clutched together, so as to avoid any danger of accidental displacement. The speed box is provided with a cover 28 removably fixed thereon and having pivotally mounted on it a lever 29 adapted to operate the clutch 27. This lever being supported by the cover, is removable therewith, and operated in a well-known way.

In order to provide for moving the gear 21 into mesh with any desired one of the several gears 22 which are of different sizes and are arranged in a step-like manner on the shaft, a carrier 30 is provided having a cylindrical perforation therethrough which fits the outside of the gear 20. It will be seen that as the gear 20 is the only support for this carrier, the carrier may be swung about the gear as a pivot and moved longitudinally thereon. On this carrier the gear 21 is journaled in such position as always to mesh with the gear 20. The carrier has an arm 32 extending out through a longitudinal opening in the speed box and curved around over the projecting side of the same. This arm carries a fastening pin 33 which is operated by a knob 34 and has a spring 35 for holding it in locked position. The speed box has a series of perforations 36 arranged in proper position to register the gear 21 with one of the several gears 22 when the pin is in the proper hole. The carrier projects inside the speed box to a position adjacent to the row of holes 36 and is provided with a cavity 37 into which the end of the pin projects, this cavity of course, being in line with the pin.

In order to provide for conveniently locating the gear in proper position a ledge 38 on the speed box contains notches 39 for receiving the web of the arm 32, each of these notches is opposite one of the perforations 36, and when the arm moves into one of the notches the pin 33 will be in position to pass through the proper perforation 36 into the cavity 37. It will be seen that the pin in this way is provided with a support at both ends so that even a small pin will hold the parts in proper position, and furthermore, that the parts are properly guided to place without requiring any skilled adjustment.

Power is transmitted through the shaft 26 and a gear or pinion 40 thereon to a crank gear 41 located within the housing. The connections inside the housing may be of any well-known form, the form which is herein illustrated comprising a crank arm 43 swinging on a pivot 44 so as to operate the ram 45 in a well known manner. This ram slides in ways 46. In order to provide a large well supported bearing surface and convenient and compact means for holding the ram in position, as well as to facilitate the application of a lubricant, the ram is provided with slides 47 having a general rectangular shaped end located in inclined position. The ways 46 are V-shaped to fit the bottom of said slide and each is provided with a ledge 48 which supports a plate 49 fastened in position and having a wedge-shaped projecting end 50 for engaging over the inclined outer surface of the slide. This construction provides for holding the slides conveniently in position by means substantially within the surface of the casing, in which the ways are located, and at the same time forms an efficient bearing surface for the ram.

The gear 41 in addition to the function above described also drives a feed device through a gear or pinion 60 mounted on a shaft 61 located in the bearings 16 with which speed box is provided. On the end of the shaft 61 is a pinion 62 which drives a gear 63 mounted on a stud 64 which is secured to a projection on the speed-box. This gear 63 has a crank 65 adapted to engage in a longitudinal slot 66 in a feed block 67. This block is pivoted on a stud 68 also mounted on the speed box, and the rotation of the gear 63 oscillates the feed block on its pivot in an obvious manner. On the feed block is mounted a bolt 69 on which is hung an arm 70 to which the feed rod 71 is secured. The bolt 69 is mounted on a slide 72 which is adjusted toward and from the stud 68 by an adjusting screw 73 so as to regulate the feed. The feed rod is connected with the usual feed screw 74 in a well known manner. The forms of the table 75, chuck 76 and parts connected therewith may be such as is well known in this art and they are so illustrated.

In setting up the speed box and its connected parts, the speed changing mechanism is first set up in the speed box when the same is on a bench or the like, away from the main part of the shaping machine. The parts of the feed device shown in Fig. 5, except the rod 71, also may be placed in position at this time. The parts of the shaper inside the housing and above the same being in position, the speed box is placed alongside the frame and moved inwardly in a straight line so that the pinions 40 and 60 will mesh with the teeth of the bear 41 and the projection bearings will enter the perforations 17. The speed box is then fixed in position by means of the bolts or the like and then the shaft 11 with the gear 20 thereon and the driving pulley removed (this gear preferably being integral with this shaft) is moved through the outside bearing 12, through the carrier 30 and then through the inside bearing 12 and the bearings on the housing. The driving pulley may then be put into position on the end of the shaft and a bushing 18 inserted in the outside bearing 12 which is large enough to permit all these parts to pass through it. In this way it will be seen that the speed changing mechanism does not have to be put in place after the speed box is mounted on the frame or housing of the shaping machine but may be set up independently and in any convenient position. In this way also, in case of any breakage the entire speed box with the feed device if desired, may be shipped independently from the shop of the manufacturer.

The improved feed device *per se* and ways set forth herein are not claimed in this case as they form the subject of separate inventions. I reserve the right to protect them in future patents.

While I have illustrated and described a preferred embodiment of the invention, I am aware that many modifications may be made therein by any person skilled in the art without departing from the scope of the invention as expressed in the claims. Therefore, I do not wish to be limited to the particular form which I have shown and described, but What I do claim is:—

1. In a shaping machine, the combination with a housing having openings therein, of a speed box removably secured to the housing, said speed box having integral bearings at its ends, those at one end being adapted to fit said openings, shafts journaled in said bearings and supported entirely thereby, speed changing devices on said shafts and within said speed box, and operating means for said speed changing devices extending through said box.

2. The combination with a housing having openings therein, of a speed box removably secured to the housing, said speed box having integral bearings, shafts located in said speed box, journaled in said bearings and supported entirely thereby, and speed changing devices on said shafts, said bearings at one end projecting from said box and extending into said openings to assist in locating the speed box in proper position on the housing when the parts are to be assembled.

3. In a shaping machine, the combination with a housing having openings in one side thereof, of a speed box having integral bearings projecting from one end thereof, one of said bearings being located at the bottom of said speed box and all of said bearings being adapted to enter and fit in said openings to locate and register the speed box while being placed in position, a shaft journaled in said lower bearing, mechanism supported by said speed box and operatively connected with said shaft, additional shafts supported by the other bearings, and speed changing devices located on said additional shafts and in the speed box.

4. In a shaping machine, the combination with a housing having openings in one side thereof, of a speed box having bearing hubs projecting from one end and adapted to fit in said openings, said speed box being removably secured to the housing, a speed changing device supported by said box and located therein and comprising shafts in said bearings, and connections for a feed device supported on the outside of said speed box and coöperating with said speed changing device.

5. In a shaping machine, the combination with a housing, of a speed box having bearings, said speed box being removably secured to the housing, a speed changing device supported by said box, connections for a feed device mounted on said speed box and coöperating with said speed changing device, a pinion connected with the speed changing device, a pinion connected with said connections, and a gear in said housing meshing with both of said pinions.

6. In a shaping machine, the combination with a housing having openings in one side thereof, of a speed box mounted on the housing and having bearing hubs projecting therefrom and adapted to fit in said openings, a speed changing device comprising connections supported by said speed box, a pinion on the speed changing device, a gear in said housing meshing with said pinion, said speed box being adapted to be applied to the housing by moving it toward the same in the direction of the axes of said pinions, whereby the speed box with the speed changing device thereon may be applied directly to the housing and placed in operative connection with the gear therein while the latter is in place within the housing.

7. In a shaping machine, the combination with a housing having openings in one side thereof, of a speed box having integral bearings projecting from one end thereof, one of said bearings being located at the bottom of said speed box and all of said bearings being adapted to enter and fit in said openings to locate and register the speed box while being placed in position, shafts supported by the bearings, speed changing devices located on said shafts and in the speed box, a cover removably mounted on said speed box, and a lever connected with the speed changing device for controlling the same, said lever being pivoted on the cover.

8. In a shaping machine, the combination with a housing having openings in one side thereof, of a speed box having integral bearings projecting therefrom, one of said bearings being adapted to enter and fit in said openings to locate and register the speed box while being placed in position, shafts supported by the bearings, speed changing devices located on said shafts and in the speed box, a cover removably mounted on the speed box, and two speed changing levers one projecting through said speed box and the other through the cover, the latter being pivotally mounted on the cover.

9. In a machine of the character described, the combination of a speed box having an opening therein, a long gear journaled in the speed box, a carrier movably mounted, a gear on the carrier meshing with said long gear, said carrier comprising an arm projecting through the opening, a pin carried by said arm, said carrier having a cavity for receiving the pin and the speed box having perforations through which said pin may pass into the cavity so as to securely hold the carrier in adjusted position with respect to said perforations.

10. In a shaping machine, the combination with a housing having openings in one side thereof, of a speed box having integral bearings projecting therefrom one of said bearing being adapted to enter and fit in said openings to locate and register the speed box while being placed in position, shafts supported by the bearings, speed changing devices located on said shafts and in the speed box, a cover removably mounted on the speed box, a speed changing lever projecting through the cover, and pivotally mounted on the cover, and a clutch member controlled by said lever and having teeth each provided with a straight portion, and an angular portion.

In testimony whereof I have hereunto set my hand, in the presence of two subscribing witnesses.

MARK FLATHER.

Witnesses:
 ALBERT E. FAY.
 C. FORREST WESSON.